United States Patent [19]

Okino

[11] Patent Number: 4,608,605
[45] Date of Patent: Aug. 26, 1986

[54] IMAGE SENSING APPARATUS

[75] Inventor: Tadashi Okino, Tokyo, Japan

[73] Assignee: Canon Kabushiki Kaisha, Tokyo, Japan

[21] Appl. No.: 678,223

[22] Filed: Dec. 5, 1984

[30] Foreign Application Priority Data

Dec. 6, 1983 [JP] Japan .................................. 58-230269
Dec. 20, 1983 [JP] Japan .................................. 58-241235

[51] Int. Cl.$^4$ ............................................. H04N 5/30
[52] U.S. Cl. .................................... 358/209; 358/213; 358/909
[58] Field of Search ............... 358/212, 213, 909, 209; 354/418, 484, 127.11, 127.12

[56] References Cited

U.S. PATENT DOCUMENTS

3,822,393  7/1974  Karpol ........................... 354/127.12
4,366,501 12/1982  Tsunekawa et al. ................. 358/909
4,504,866  3/1985  Saito .................................... 358/213

Primary Examiner—Gene Z. Rubinson
Assistant Examiner—Stephen Brinich
Attorney, Agent, or Firm—Toren, McGeady, Stanger, Goldberg & Kiel

[57] ABSTRACT

An image sensing apparatus comprises a flash discharge tube; a trigger circuit which ionizes a gas within the flash discharge tube; a switch circuit which causes the flash discharge tube to flash; an image sensing device which converts an optical image into an electrical signal; a clearing circuit which clears the electric signal produced by the image sensing device at least during and/or right after the operation of the trigger circuit; a control circuit which causes the switch circuit to operate after completion of the operation of the clear circuit; a signal processing circuit for processing the output of the image sensing device; and a charging circuit which stops charging thereof in relation to the processing of the signal processing circuit on the output of the image sensing device corresponding to an image of an object illuminated by the flash discharge tube. The image sensing apparatus prevents the energy of the flash discharge tube from affecting the output of the image sensing device.

21 Claims, 15 Drawing Figures

IMAGE SENSING APPARATUS

BACKGROUND OF THE INVENTION

1. Field of the Invention

This invention relates to an image sensing apparatus using a flash device in combination with an image sensor such as a camera tube, a CCD or the like.

2. Description of the Prior Art

The conventional electric flash device for a camera starts flashing by ionizing a gas within a flash discharge tube with a trigger voltage of several thousand volts and several hundred KHz. Meanwhile, the image sensor of an electronic camera and a signal processing circuit following it are required to process a weak signal high frequency. This point represents a fundamental difference of the camera of the above-stated kind from the conventional camera which uses a silver halide film. The high voltage, high frequency trigger signal, therefore, causes noises and erroneous actions to a great extent. Furthermore, in order to give effective illumination, the flash device of the kind generally used for a camera must have capacitor a large capacity quickly charged with a sufficient amount of energy for flashing. That requires a switching action to be performed on a large current within a booster circuit for charging. Then, the switching action produces a very large amount of noise.

The present invention is directed to the elimination of the above-stated inconveniences which result from the use of conventional electric flash devices for an electronic camera. It is therefore an object of the invention to provide an image sensing apparatus which is free from the adverse noise resulting from a trigger signal.

It is another object of the invention to provide an image sensing apparatus which is of the kind to be used together with an illumination device such as a flash device and which is capable of preventing picture quality from being eroded by noise produced during charging of the illumination device with the noises mixing in the outputs of a signal processing circuit, a recording circuit, etc.

These and further objects and features of the invention will become apparent from the following detailed description of preferred embodiments thereof taken in conjunction with the accompanying drawings.

SUMMARY OF THE INVENTION

An image sensing apparatus includes illuminating means which includes electric energy accumulating means, the illuminating means illuminating an object to be photographed with electric energy accumulated by the electric energy accumulating means; charging means for charging the electric energy accumulating means, image sensing means to convert an image of the object illuminated by the illuminating means into an electrical signal; signal processing means for processing the output of the image sensing means; and control means to bring the operation of the charging means to a stop in relation to the processing operation of the signal processing means performed on the output of the image sensing means which corresponds to the image of the object illuminated by the illuminating means.

BRIEF DESCRIPTION OF THE DRAWINGS

FIGS. 2(a)–2(e) are charts showing the timing for the outputs of a sequence controller 107.

DETAILED DESCRIPTION OF THE PREFERRED EMBODIMENTS

Figure 1:
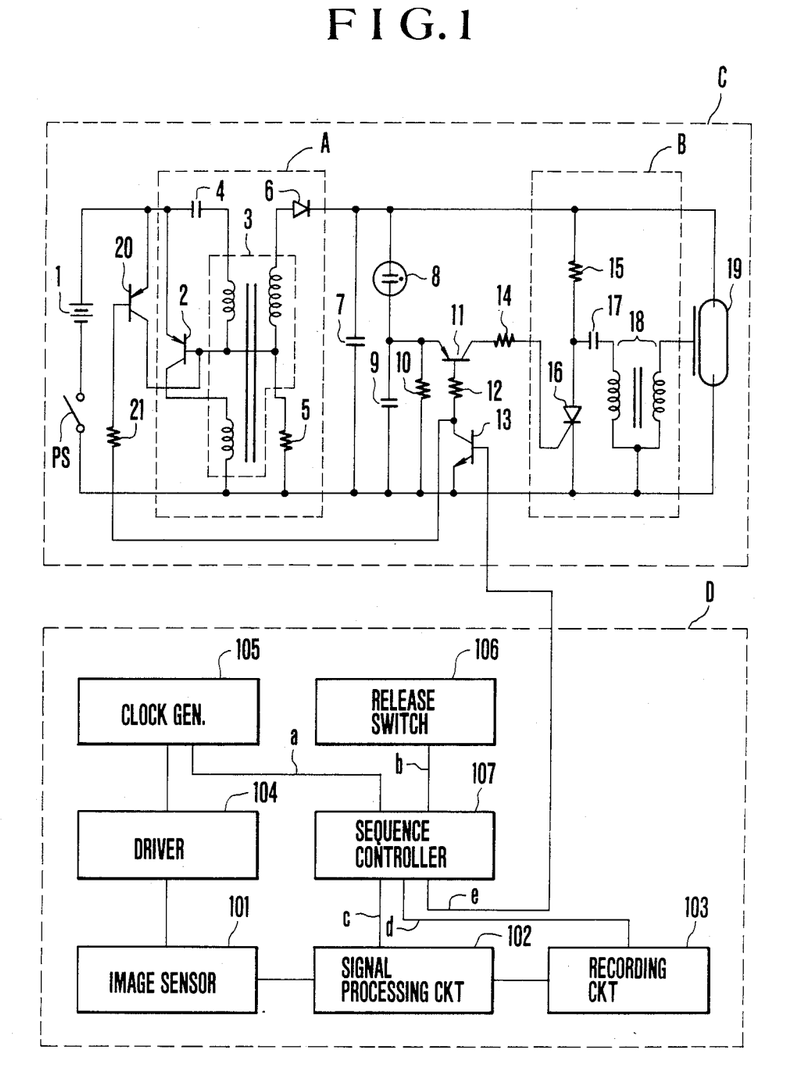
FIG. 1 is a circuit diagram showing an embodiment of this invention.

The details of this invention will be understood from the following description with reference to the accompanying drawings:

FIG. 1 shows an embodiment of the invention in a circuit diagram. The illustration includes a battery 1 and a power supply switch PS. A boosting-and-charging circuit A for charging a main capacitor 7 which is the electric energy accumulating means is formed by an oscillation transistor 2, an oscillation transformer 3, a capacitor 4, a resistor 5 and a rectifying diode 6. A series circuit consisting of a neon lamp 8 a capacitor 9 and a flash discharge tube 19 which is arranged as illuminating means is connected in parallel with the main capacitor 7. A resistor 10 is connected in parallel to the capacitor 9. A transistor 11 has its emitter connected to a node between the neon lamp 8 and the capacitor 9 and its base to the cathode of the battery 1 via a resistor 12 and the collector and emitter of a transistor 13. The collector of the transistor 11 is connected to the gate of a trigger thyristor 16 via a resistor 14. A trigger capacitor 17 and a trigger transformer 18 jointly form a trigger circuit B for the flash discharge tube 19.

A transistor 20 has its emitter connected to the emitter of the oscillation transistor 2, its collector to the base of the transistor 2 and its base to the collector of the transistor 13 via a resistor 21. An image sensor 101, which is a CCD or the like, serves as image sensing means by converting an object image into an electrical signal. The embodiment includes a signal processing circuit 102; a recording circuit 103; a driver 104 for the image sensor 101; a clock generator 105; a release switch 106; and a sequence controller 107 which serves as control means. One output terminal "e" of the sequence controller 107 is connected to the base of the transistor 13. A block C represents an illuminating device and a block D the body of the image sensing apparatus 101. The blocks C and D may be either separate from each other or united in one body within a casing. The first embodiment of the invention is arranged as described above. The operation of the first embodiment will be described below with reference to FIGS. 2(a)–2(e):

FIGS. 2(a)–2(e) jointly form a timing chart showing the operation of the circuit arrangement shown in FIG. 1. When the power supply switch PS is turned on, the boosting-and-charging circuit A is rendered operative and begins to charge the main capacitor 7. The neon lamp 8 lights up when the charge voltage of the main capacitor 7 reaches a level sufficient for flashing. A current which lights up the neon lamp 8 charges the capacitor 9 and flows to the resistor 10.

Figures 2A, 2E:
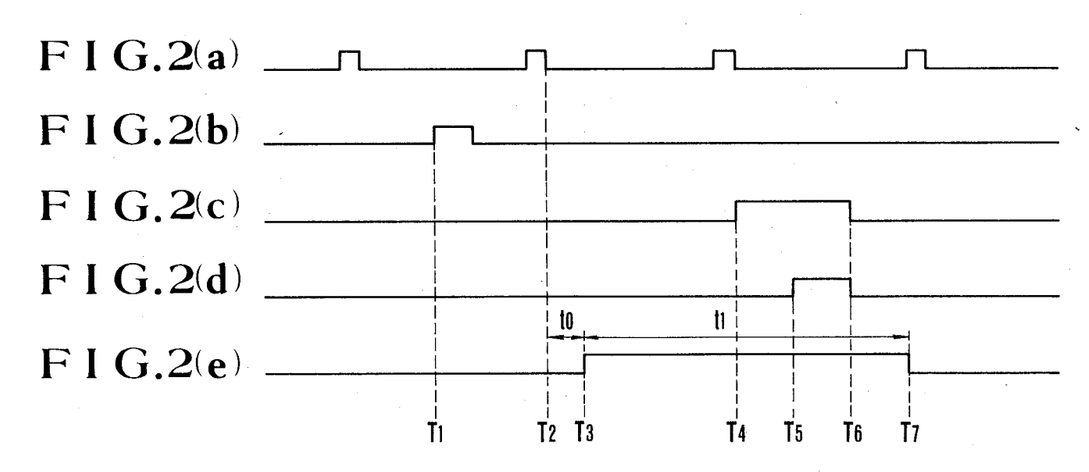

After the neon lamp 8 lights up, when a release button (not shown) which is provided for starting an image sensing operation is pushed at a point of time T1 as shown in FIG. 2(b), the release switch 106 turns on. A release signal "b", which is thus produced, is in a random time relation to a periodical vertical synchronizing signal "a" which is produced from the clock generator 105 as shown in FIG. 2(a). Therefore, a positive pulse "e" which lasts for a period t1 is supplied to the transistor 13 from a suitable point of time T3 during one television field period, after the lapse of a predetermined length of time t0 from a point of time T2, with both the signals "b" and "a" having been obtained (see FIG. 2(e)). Then, the sequence controller 107 supplies a current to the base of the transistor 13. The transistor 13 turns on and the current flows to the resistors 12 and 21.

With the current thus flowing into the resistor 12, a current flows to the base of the transistor 11 turning it on. Then, a current is supplied via the resistor 14 from the collector of the transistor 11 to the gate of the thyristor 16. This causes the thyristor 16 to turn on. The trigger circuit B becomes operative. The flash discharge tube 19 flashes to illuminate an object to be photographed. While the flash discharge period is about 1 msec, one television field is about 16 msec in the case of the NTSC color system. Therefore, the flashing action is accomplished in a moment. Furthermore, with the current flowing to the other resistor 21, a base current is supplied to the transistor 20 turning it on. The part between the emitter and collector of the transistor 20 then becomes conductive, short circuiting part between the base and emitter of the oscillation transistor 2. This brings the operation of the boosting-and-charging circuit A to a stop.

Upon completion of an image sensing operation which begins at the point of time T2 with the flashing action accomplished within one field period, the sequence controller 107 supplies pulses "c" and "d" at suitable points of time during a next field period to the signal processing circuit 102 and the recording circuit 103. This causes the signal processing circuit 102 and the recording circuit 103 to process and record an image signal during periods between points of time T4 and T6 and between points of time T5 and T6 in FIGS. 2(c) and 2(d).

Meanwhile, the positive pulse "e", which is supplied from the sequence controller 107 to the transistor 13, lasts until a point of time T7 at which time the field period comes to an end, as shown in FIG. 2(e). Accordingly, during this period, the transistor 13 remains on and the current continues to flow to the resistor 21. The transistor 20 then continuously short-circuits the part between the base and the emitter of the oscillation transistor 2. The boosting-and-charging circuit A thus remains inoperative during the signal processing and recording operation. Therefore, the embodiment is completely free from any adverse effect of noises produced from this oscillating circuit.

In this embodiment, the charging circuit A suspends the operation thereof during the period from the start of flashing by the flash device at the point of time T3 until the point of time T7 at which time the same field period comes to an end, after completion of recording of an image signal representing the object illustrated by the flash light of the flash device. This feature of the embodiment is obtained by virtue of the transistor 13 which performs a combined function as a switch for actuating the trigger circuit B. Therefore, the charging circuit A is not in repose over the whole period between the points of time T3 and T7. It is important to keep the charging circuit A in repose for a length of time required by the signal processing circuit 102 for processing the image signal of the object illuminated by the illuminating means, i.e. during the period between the points of time T4 and T6.

Furthermore, in this specific embodiment, the signal processing circuit 102 operates for a period between the points of time T4 and T6. However, the circuit 102 may be arranged constantly operative. Even in that case, it is sufficient for the charging circuit A to suspend its operation only for the length of time required for processing an image signal corresponding to the object illuminated. In the image sensing apparatus arranged in the first embodiment of this invention, as described above, the charging action is inhibited for a predetermined period of time during the signal processing and recording operation. This precludes any possibility of mixing in noises from the flash device. Furthermore, since the charging action is suspended for only a part of the whole signal processing period, the charging efficiency is not much affected by the suspending arrangement.

Figure 3:
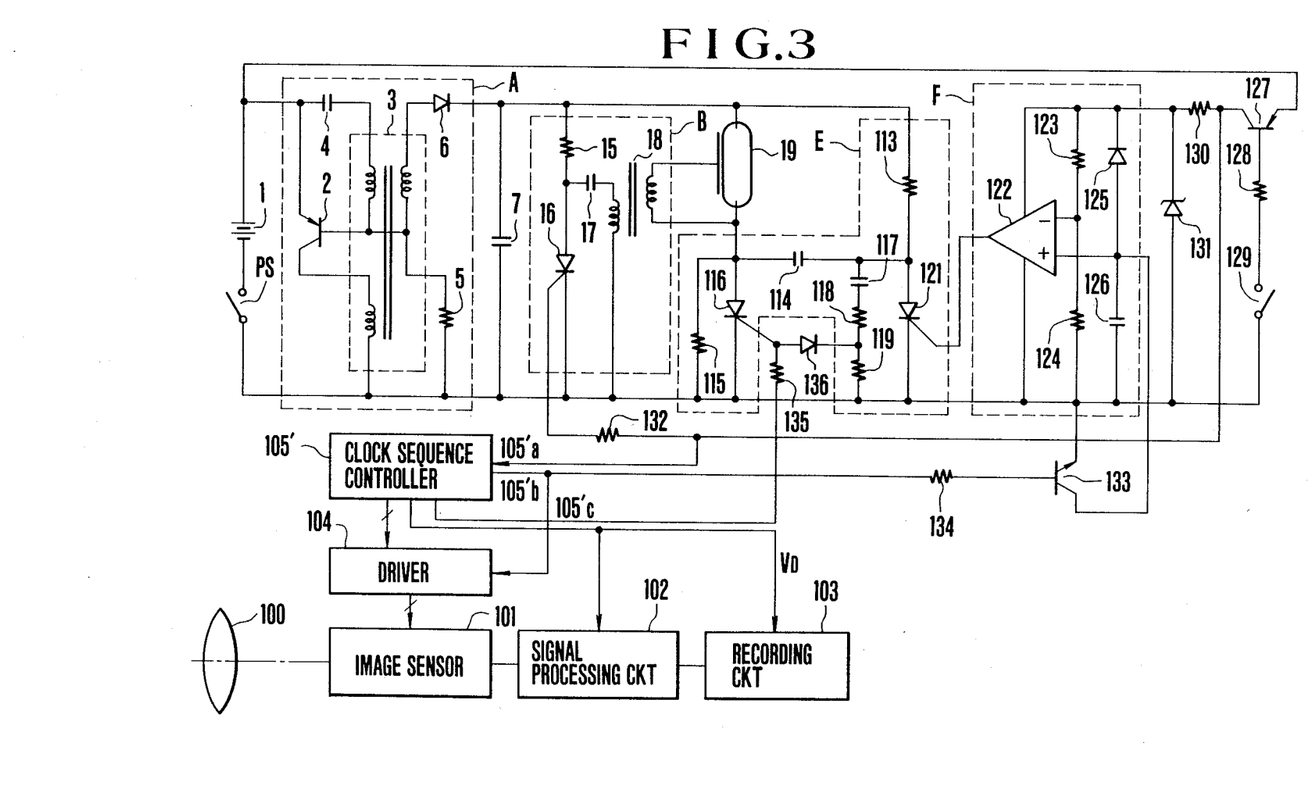
FIG. 3 is a circuit diagram showing another embodiment of this invention.
Figure 4A:
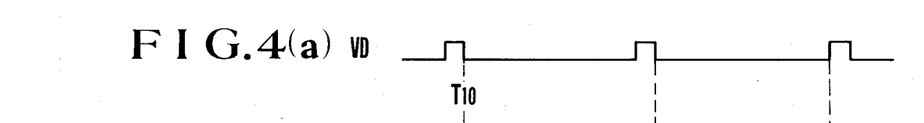
FIGS. 4(a)–4(g) are charts showing the timing for the outputs of the same embodiment of FIG. 3.
Figure 4B:
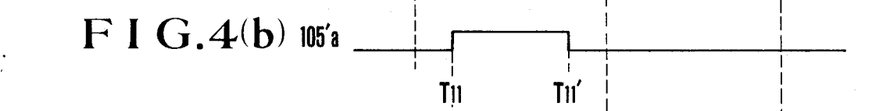
Figure 4C:
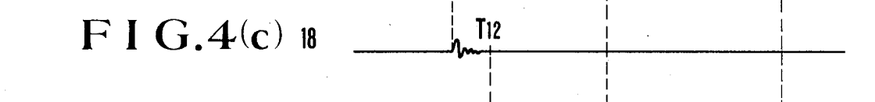
Figures 4D, 4E:
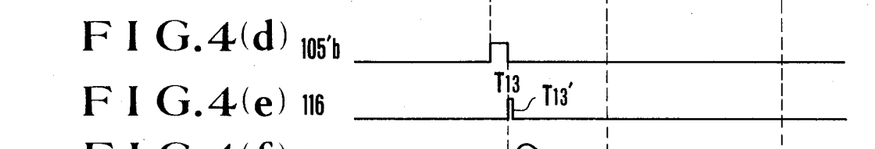
Figures 4F, 4G:
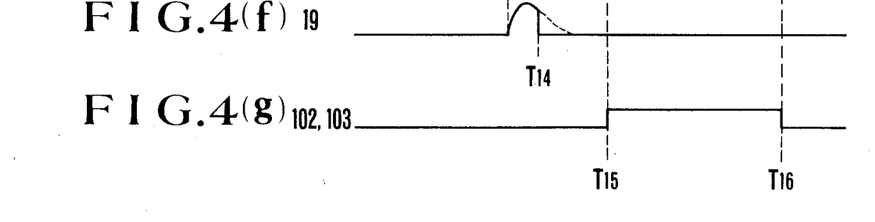
Figure 5:
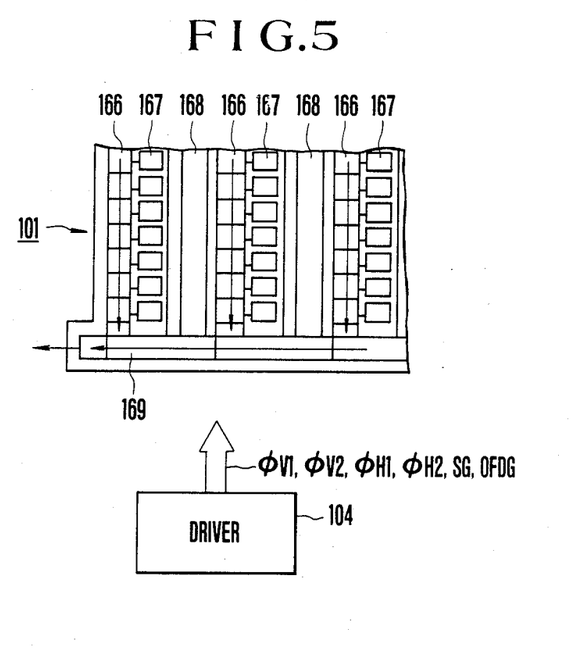
FIG. 5 shows, by way of example, the arrangement of an image sensor.

FIGS. 3-5 show a second embodiment of this invention. In this case, the output of the image sensor 101 is not affected by any noise produced during the ionization of a gas within the flash discharge tube 19 at the time of flashing by the flash discharge tube 19. In FIG. 3 which is a circuit diagram showing the second embodiment, the same reference numerals as those used in FIGS. 1 and 2 identify the same elements. In the embodiment, a light quantity control circuit E is formed by a resistor 113, a commutation capacitor 114, a resistor 115, a main thyristor 116 which serves as switching means, a capacitor 117, resistors 118 and 119 and an auxiliary thyristor 121.

A photometric circuit F is formed by a comparator 122, resistors 123 and 124, a light receiving photo-sensitive element 125 and a capacitor 126. The output terminal of the comparator 122, which produces the output of the photometric circuit F, is connected to the gate of the auxiliary thyristor 121. A transistor 127 has its emitter connected to the positive electrode of the battery 1, its base to the negative electrode (ground) of the battery 1 via a resistor 128 and a synchro-switch 129 and its collector to the ground via a resistor 130 and a constant voltage diode 131. The photometric circuit F is connected in parallel to the constant voltage diode 131. The collector of the transistor 127 is also connected to the gate of the trigger thyristor 16 via a resistor 132.

In the lower part of the drawing is shown an optical system consisting of a lens 100, a stop, a shutter, etc. The optical system has an optical image incident upon the image sensor 101, which is a CCD or the like and which converts the optical image into an electrical signal. A clock sequence controller 105' serves as timing control means. The collector of the transistor 127 is connected to an input terminal 105'a of the clock sequence controller 105'. A transistor 133 is connected in parallel to the capacitor 126 of the photometric circuit F. The base of this transistor 133 is connected via a resistor 134 to a terminal 105'b of the clock sequence controller 105'. One output terminal 105'c of the clock sequence controller 105' is connected via a resistor 135 to the gate of the main thyristor 116. The gate of the main thyristor 116 is connected via a diode 136 to a node between the resistors 118 and 119.

The second embodiment of the invention, which is arranged as described above, operates as described below with reference to FIGS. 4(a) - 4(g) and 5:

When the power supply switch PS of the flash device is turned on after the power supply of the camera is switched on, the oscillating booster circuit A operates, charging the main capacitor 7 via the diode 6. Meanwhile, with the power supply of the camera switched on, the circuits 101-105 begin to operate. Let us assume that the synchroswitch 129 is turned on at a predetermined point of time in response to operation of the release button after the charge voltage of the main capacitor 7 has reached a sufficient value for flashing. Referring to FIG. 4(b), the timing for turning this synchro-switch 129 on is not-related to a vertical synchronizing signal VD produced from the clock sequence controller 105' (see FIG. 4(a)). Let us assume that the point of time at which the synchro-switch 129 is turned on is T11 and a point of time at which a field corresponding to this begins is T10. With the synchro-switch 129 turned on, a current is supplied to the base of the transistor 127 via the resistor 128 and the synchro-switch 129. Therefore, the transistor 127 turns on supplying a current to the gate of the trigger thyristor 16 via the resistor 132. The trigger thyristor 16 turns on and the trigger circuit B operates. Then, the gas within the flash discharge tube 19 is ionized. The trigger circuit B begins to operate almost without any delay when the synchro-switch 129 turns on, as shown in FIG. 4(c), and operates only for several tens of micro-seconds. The trigger high voltage disappears before a point of time T12 as shown in FIG. 4(c). With the transistor 127 turned on at the point of time T11, a positive pulse is supplied to the clock sequence controller 105' via the terminal 105'a thereof. Then, within the clock sequence controller 105', a pulse which becomes high level during a period between points of time T12 and T13 is formed as shown in FIG. 4(d) and is produced from the terminal 105'b of the controller 105'. This pulse is applied via the driver 104 to the image sensor 101 to clear it. The pulse, at the same time, turns on the transistor 133 via the resistor 134. This causes the two ends of the capacitor 126 to be short-circuited. Any adverse effect of a noise on the image sensor 101 and the capacitor 126 due to the trigger high voltage generated between the points of time T11 and T12 is thus removed by the clearing action performed between the points of time T12 and T13. Referring to FIG. 4(e), a positive pulse is produced for a very short period of time from the output terminal 105'c of the clock sequence controller 105' between the points of time T13 and T13', upon completion of the above-stated clearing action. This short pulse causes a current to be supplied via the resistor 135 to the gate of the main thyristor 116. The main thyristor 116 turns on. Then, the flash discharge tube 19, which has been ionized, begins to flash.

Meanwhile, a current has been flowing to the series circuit consisting of the resistor 130 and the constant voltage diode 131 with the transistor 127 turned on at the point of time T11. Since the photometric circuit F has been receiving power by virtue of a voltage generated at the two ends of the constant voltage diode 131, the output level of the comparator 122 becomes high when an integrated value of reflected light from the object to be photographed reaches a value suited for photography at a point of time T14. A current is then supplied to the gate of the auxiliary thyristor 121 to turn it on. Following this, the light quantity control circuit E operates, ending the flashing action at the point of time T14.

The diode 136 operates as follows: With the gas of the flash discharge tube 19 ionized, the anode of the main thyristor 116 is at a high potential to generate a positive voltage at the node between the resistors 118 and 119 via the commutating capacitor 114 and the capacitor 117. In this case, by virtue of the diode 136, no current is supplied to the main thyristor 116 to prevent the main thyristor 116 from turning on concurrently with the ionization of the flash discharge tube 19. Meanwhile, when the auxiliary thyristor 121 turns on, the capacitor 117 discharges its electric charge to generate a negative voltage at the node between the resistors 118 and 119. Then, the diode 136 turns on to apply a reverse bias voltage on the gate of the main thyristor 116. This shortens the length of time required for turning the main thyristor 116 off.

Next, in the next field after flashing between points of time T15 and T16 as shown in FIG. 4(g), the signal processing circuit 102 and the recording circuit 103 are operated, processing and recording the image signal which is produced from the image sensor 101 on a record bearing medium. Furthermore the period between the points of time T13 and T13' is sufficiently shorter than the flashing time between the points of time T13 and T14 shown in FIG. 4(f) and is set at the shortest possible time, say, several micro-seconds, for turning on the main thyristor 116.

The CCD which is employed as the image sensor 101 in this embodiment is arranged as schematically shown in FIG. 5. Referring to FIG. 5, the image sensor 101 is an inter-line transfer type CCD including light receiving parts 167 arranged in a matrix like manner for picture elements; vertical transfer registers 166 each of which is formed on one side of every vertical line of the light receiving parts 167; overflow drains 168 each of which is formed on the other side of every vertical line of the light receiving parts 167; and a horizontal transfer register 169 which is arranged along the ends of the above vertical transfer registers 166. In the image sensor 101, each light receiving part 167 accumulates electric charge for one vertical period 1V based on the quantity of light of an image with which these light receiving parts 167 are illuminated via the optical system 100. The accumulated electric charge is vertically transferred via the vertical transfer register part 166 to the horizontal transfer register part 169. The horizontal line portion of the accumulated electric charge is then produced at every horizontal scanning period 1H through the horizontal transfer register part 169. The image sensor 101 operates under the control of a sensor gate clock signal SG, an overflow drain gate clock signal OFDG, vertical transfer clock signals $\phi V1$ and $\phi V2$ and horizontal transfer clock signals $\phi H1$ and $\phi H2$ produced from the driver 104.

The above-stated sensor gate clock signal SG controls the photo-electric converting action of each light receiving part 167. With one vertical scanning period 1V as a cyclic repeating period, the signal SG causes each of the light receiving parts 167 to accumulate the electric charge by performing the photoelectric converting action for a predetermined period within each period 1V. Then, the accumulated electric charge is read out and supplied to the vertical transfer register part 166. The overflow drain gate clock signal OFDG permits a desired shutter speed by controlling the potential at each of the overflow drains 168 formed on one side of the vertical line of the light receiving parts 167. This drain gate clock signal OFDG corresponds to the signal 105'b shown in FIG. 3. During a period in which the overflow drain gate clock signal OFDG is at logical "1", the electric charge accumulated at each of the light receiving parts 167 is discarded to the overflow drain 168 and no substantial electric charge is accumulated at each of the light receiving parts 167 during that period. During a period when the sensor gate clock signal SG is at logical "1" and the overflow drain gate clock signal OFDG is at logical "0", each of the light receiving parts 167 accumulates an amount of electric charge corresponding to the quantity of light incident upon it during that period.

The image sensor does not have to be a CCD and an XY address type MOS image sensor may be employed in place of the CCD. Any image sensor that is capable of converting an optical image into, for example, an electrical signal is usable.

Further, the clearing means is also not limited to the arrangement described. In case where, for example, a frame transfer type CCD is used, the clearing action may be accomplished by means of a vertical transfer clock signal. Even with an inter-line type CCD employed as in the case of the embodiment described, the clearing action may be accomplished by forcedly transferring the signal to the register 166 during the period 1V by means of a pulse signal SG. Further, the clearing action may be accomplished by utilizing a recombination action of electric charge which takes place at an interface between the insulation layer of the semiconductor substrate.

In this specific embodiment, the clearing action is arranged to be performed after the operation of the trigger circuit. This arrangement is employed for the purpose of facilitating image monitoring by periodically driving the image sensor before flashing. However, in the event of monitoring through an optical view finder, the clearing action may be arranged to be performed during a period after the power supply is switched on and before the point of time T12 after the operation of the trigger circuit at the latest.

In accordance with the arrangement of the second embodiment of the invention as described above, the main flashing action starting time is arranged to be deferred after the operation of the trigger circuit and the electrical information generated at the image sensor during that deferred period is cleared. This arrangement completely eliminates the adverse effect of a high voltage and a high frequency which otherwise affect the output of the image sensing device as a result of a triggering action.

What is claimed is:

1. An image sensing apparatus, comprising:
    illuminating means including electric energy accumulating means, said illuminating means being arranged to illuminate an object to be photographed with an electric energy accumulated by said electric energy accumulating means;
    charging means for charging said electric energy accumulating means;
    image sensing means arranged to convert an image of said object illuminated by said illuminating means into an electrical signal;
    signal processing means for processing the output of said image sensing means; and
    control means arranged to bring the operation of said charging means to a stop in relation to the processing operation of said signal processing means performed on the output of said image sensing means which corresponds to the image of said object illuminated by said illuminating means.

2. The apparatus according to claim 1, wherein said illuminating means further includes a flash device.

3. The apparatus according to claim 1, wherein said charging means includes an oscillator.

4. The apparatus according to claim 1, wherein said signal processing means includes a signal processing ciruit which is provided for recording.

5. The apparatus according to claim 1, wherein said electric energy accumulating means includes a capacitor.

6. An image sensing apparatus adapted for operation in combination with an illuminating device which includes charging means, said apparatus comprising:
    image sensing means arranged to convert into an electrical signal an image of an object to be photographed;
    signal processing means for processing the output of said image sensing means; and
    control means arranged to produce a signal for bringing the operation of said charging means to a stop in relation to the processing operation of said signal processing means on the output of said image sensing means which corresponds to the image of said object illuminated by said illuminating means.

7. The apparatus according to claim 6, wherein said illuminating means further includes a flash device.

8. The apparatus according to claim 6, wherein said charging means includes an oscillator.

9. The apparatus according to claim 6, wherein said signal processing means includes a signal processing circuit which is provided for recording.

10. An illuminating device to be used in combination with an image sensing device, said illuminating device comprising:
    flashing means;
    electric energy accumulating means for accumulating an energy required by said flashing means for flashing;
    charging means for supplying said energy to said accumulating means; and
    switching means arranged to control the charging action of said charging means in accordance with a signal from said image sensing device.

11. The device according to claim 10, wherein said charging means includes an oscillator.

12. The device according to claim 10, wherein said device is to be attachable to and detachable from said image sensing device.

13. The device according to claim 10, wherein said electric energy accumulating means includes a capacitor.

14. The device according to claim 10, further comprising a battery arranged to supply a direct current to said charging means.

15. The device according to claim 14, further comprising a switch for cutting off power supply from said battery to said charging means.

16. An image sensing apparatus, comprising:
    a flash discharge tube;
    trigger means arranged to ionize a gas within said flash discharge tube;
    switching means arranged to cause said flash discharge tube to flash;
    image sensing means arranged to convert an optical image into an electrical signal;
    clearing means for clearing the electrical signal produced by said image sensing means at least after the operation of said trigger means; and control means arranged to cause said switching means to operate after completion of the operation of said clearing means.

17. The apparatus according to claim 16, wherein said image sensing means includes light receiving parts, and wherein said clearing means is arranged to clear electric charge existing at said light receiving parts of said image sensing means to the outside of the light receiving parts.

18. The apparatus according to claim 17, wherein said clearing means includes overflow drain arrangement.

19. An image sensing apparatus, comprising:
image sensing means arranged to convert an optical image into an electrical signal;
clearing means for clearing the electrical signal produced by said image sensing means; and
control means arranged to form control signals which cause said clearing means to operate at least after a triggering action performed for ionizing a gas within a flash discharge tube and which cause said flash discharge tube to flash after completion of the clearing action of said clearing means.

20. The apparatus according to claim 19, wherein said image sensing means includes light receiving parts, and wherein said clearing means is arranged to clear electric charge existing at said light receiving parts of said image sensing means to the outside of the light receiving parts.

21. The apparatus according to claim 20, wherein said clearing means includes overflow drain arrangement.

* * * * *